United States Patent

Miyahara et al.

[11] Patent Number: 5,840,830
[45] Date of Patent: Nov. 24, 1998

[54] PROCESS FOR PRODUCING POLY (ARYLENE SULFIDE)

[75] Inventors: Michihisa Miyahara, Wilmington, N.C.; Hiroyuki Sato; Yoshikatsu Satake, both of Fukushima-ken, Japan

[73] Assignee: Kureha Kagaku Kogyo K.K., Tokyo, Japan

[21] Appl. No.: 802,343

[22] Filed: Feb. 11, 1997

[30] Foreign Application Priority Data

Feb. 21, 1996 [JP] Japan ................................. 8-058316

[51] Int. Cl.$^6$ .................................................. C08G 75/14
[52] U.S. Cl. ............................................................. 528/388
[58] Field of Search ............................................... 528/388

[56] References Cited

U.S. PATENT DOCUMENTS

| | | | |
|---|---|---|---|
| 3,354,129 | 11/1967 | Edmonds, Jr. et al. | 260/79 |
| 3,783,138 | 1/1974 | Miles et al. | |
| 3,919,177 | 11/1975 | Campbell | 260/79.1 |
| 4,371,671 | 2/1983 | Anderson | 528/388 |
| 4,575,387 | 3/1986 | Larue et al. | 62/17 |

FOREIGN PATENT DOCUMENTS

| | | |
|---|---|---|
| 0 373 364 | 6/1990 | European Pat. Off. . |
| 45-3368 | 2/1970 | Japan . |
| 52-12240 | 4/1977 | Japan . |
| 63-33775 | 7/1988 | Japan . |
| 02 160 833 | 6/1990 | Japan . |
| 2-160833 | 6/1990 | Japan . |
| 2160833 | 6/1990 | Japan . |

*Primary Examiner*—Melvyn I. Marquis
*Assistant Examiner*—D. Aylward
*Attorney, Agent, or Firm*—McDermott, Will & Emery

[57] ABSTRACT

The invention provides a process for producing a poly (arylene sulfide) comprising a dehydration step of heating and dehydrating a mixture containing an organic amide solvent (a), an alkali metal sulfide and water to control a water content in the mixture and a subsequent polymerization step of subjecting the alkali metal sulfide and a dihaloaromatic compound to a polymerization reaction in the organic amide solvent (a), wherein hydrogen sulfide vaporized off during the dehydration step is absorbed in another organic amide solvent (b) outside a system in which the dehydration step is carried out, thereby recovering it, and the hydrogen sulfide thus recovered is reused in the polymerization reaction as a raw material for the alkali metal sulfide. The production process of the invention can solve various problems attendant upon the vaporization of hydrogen sulfide and provide a poly(arylene sulfide) which undergoes little variation in melt viscosity and has stable quality.

19 Claims, No Drawings

PROCESS FOR PRODUCING POLY
(ARYLENE SULFIDE)

FIELD OF THE INVENTION

The present invention relates to a process for producing a poly(arylene sulfide), and more particularly to a process for producing a poly(arylene sulfide) by controlling a water content in a reaction system by a dehydration step in advance and then reacting an alkali metal sulfide with a dihalo-aromatic compound in an organic amide solvent, wherein hydrogen sulfide vaporized off in the dehydration step is recovered and reused, thereby solving various problems attendant upon the vaporization of hydrogen sulfide and producing a poly(arylene sulfide) which undergoes little variation in melt viscosity and has stable quality.

BACKGROUND OF THE INVENTION

Poly(arylene sulfides) (hereinafter abbreviated as "PASs") are engineering plastics excellent in heat resistance, chemical resistance, flame retardancy, mechanical strength, electric properties, dimensional stability and the like. Since PASs can be molded or formed into various molded products, films, sheets, fibers, etc. in accordance with conventional melt processing techniques such as extrusion, injection molding and compression molding, they are commonly used in wide fields such as electrical and electronic equipments and parts, and automotive machine parts.

As a typical production process of a PAS, a process wherein an alkali metal sulfide is reacted with a dihalo-aromatic compound in an organic amide solvent such as N-methyl-2-pyrrolidone has been known (Japanese Patent Publication No. 3368/1970, etc.). In the early stage of the PAS production, it was possible only to obtain a high-molecular weight polymer by preparing a polymer of a low polymerization degree and then heating the polymer in the presence of air to subject it to partial oxidative crosslinking. After that, the production process was variously improved to develop a process for obtaining a high-molecular weight PAS by a polymerization reaction. For example, a process wherein a polymerization reaction is conducted in the presence of various polymerization aids (Japanese Patent Publication No. 12240/1977) and a process wherein a polymerization reaction is conducted under the specific control of the amount of co-existing water and reaction temperature (Japanese Patent Publication No. 33775/1988) have been proposed. These processes have permitted the provision of linear, high-molecular weight PASs.

In these production processes of PAS, it is necessary to strictly control polymerization conditions such as a molar ratio of an alkali metal sulfide to a dihalo-aromatic compound, an amount of co-existing water, a polymerization temperature and polymerization time in order to stably obtain a PAS of high quality. For example, if the amount of the co-existing water in the polymerization reaction system is too small, undesirable reactions such as decomposition of a PAS formed tend to occur. If the amount is too great to the contrary, the polymerization rate becomes markedly low, and undesirable side reactions occur. On the other hand, an alkali metal sulfide is generally used as a raw material in the form of a hydrate containing water of crystallization in plenty. Besides, the alkali metal sulfide may be prepared in situ by the reaction of an alkali metal hydrosulfide and an alkali metal hydroxide in an organic amide solvent. In this case, water is formed as a by-product. Further, these raw materials may be added to the reaction system in the form of an aqueous solution in some cases. Accordingly, a great amount of water comes to exist in the polymerization reaction system.

Therefore, the production of the PAS generally requires a dehydration step for heating and dehydrating a mixture containing an organic amide solvent and an alkali metal sulfide to control the water content in the polymerization reaction system prior to the polymerization reaction. The dehydration step is operated in the presence of the organic amide solvent, which is a solvent for the polymerization reaction, and carried out until the water content is reduced to generally about 0.3–5 mol per mol of the alkali metal sulfide by discharging water out of the system by distillation. When the amount of water is overreduced by the dehydration step, water is added prior to the polymerization reaction to control the water content within a desired range. After controlling the amount of the co-existing water, a dihalo-aromatic compound is charged into the reaction system, and the resultant mixture is heated, thereby conducting a polycondensation reaction.

By the way, the alkali metal sulfide reacts to water in the organic amide solvent in the above dehydration step, whereby hydrogen sulfide ($H_2S$) is equilibratorily dissociated and vaporized off in accordance with a reaction represented by the following formula:

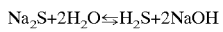

$$Na_2S + 2H_2O \rightleftharpoons H_2S + 2NaOH$$

When water is distilled off by the heating in the dehydration step, the water is usually discharged in the form of an azeotropic mixture with the organic amide solvent out of the system. Alternatively, the organic amide solvent and water are separated from each other by distillation, and only water is discharged. At the same time, hydrogen sulfide formed is also vaporized out of the system. The vaporization of hydrogen sulfide in the dehydration step causes the following problems in an industrial process for producing a PAS.

First, there has been a problem that since the substantial quantitative ratio of the alkali metal sulfide varies due to the vaporization of hydrogen sulfide, the melt viscosity (corresponding to degree of polymerization) of a polymer as a product varies every lot. In general, the quality of a polymer formed varies every lot according to the change-over of raw materials (in particular, the alkali metal sulfide and/or the alkali metal hydrosulfide), variation in raw material composition accompanying change in grade of PAS, variation in the amount of hydrogen sulfide vaporized off accompanying change in heating and dehydrating rate, or the like. Further, even when polymers are produced by using the same raw materials under substantially the same conditions, the polymers formed undergo lot-to-lot variation because the amount of hydrogen sulfide vaporized off in the dehydration step brings about changes.

Second, there has been a problem that it is difficult to stably produce a PAS of high polymerization degree due to the vaporization of hydrogen sulfide. Since a way of polymerization reaction between the alkali metal sulfide and the dihalo-aromatic compound is a polycondensation reaction between both components, it is desirable that a molar ratio between both components be brought close to 1:1 as much as possible in order to obtain a PAS of high polymerization degree. For that reason, the charged amount of the alkali metal sulfide and/or the alkali metal hydrosulfide is controlled in anticipation of the amount of hydrogen sulfide vaporized off in the dehydration step. However, it is difficult to exactly control the molar ratio between both components in the reaction because the range of variation in the amount of the hydrogen sulfide vaporized off is great. If the amount of the hydrogen sulfide vaporized off is smaller than the expected amount, and so the molar ratio of the alkali metal sulfide to the dihalo-aromatic compound becomes high, undesirable side reactions such as rapid decomposition reaction tend to occur. In order to obtain the PAS of high polymerization degree, it is therefore essential to strictly control and measure the amount of hydrogen sulfide vaporized off. It has however been difficult to achieve the intended melt viscosity and narrow a scatter of melt viscosity due to the vaporization of hydrogen sulfide in the dehydration step.

Third, hydrogen sulfide vaporized off in the dehydration step is a harmful substance and an environmental pollutant which is scattered as a gas in the air. A special equipment is required for treating hydrogen sulfide, and so an economic burden becomes great.

Forth, there has been a problem that when hydrogen sulfide is vaporized off in the dehydration step, the alkali metal sulfide and/or the alkali metal hydrosulfide, which are raw materials, are lost. In the dehydration step, these raw materials are generally lost in a proportion of 2–5% in terms of sulfur by the vaporization of hydrogen sulfide. If this lost sulfur (i.e., hydrogen sulfide) may be reused, for example, by recycling it to the polymerization reaction system, the raw materials can be economized, and moreover the equipment for treating the hydrogen sulfide vaporized off is made unnecessary, thus leading to reduction in the product cost of PAS and prevention of environmental pollution.

In the past, some proposals have been made for solving the various problems attendant upon the vaporization of hydrogen sulfide in the dehydration step. For example, (1) a method in which the amount of hydrogen sulfide vaporized off in the dehydration step is determined to precisely find the amount of a sulfur source existing in a reaction system (Japanese Patent Publication No. 33775/1988) and (2) a method in which hydrogen sulfide vaporized off is absorbed in an aqueous solution of an alkali metal hydroxide to recycle to a dehydration step and/or a polymerization step in a subsequent batch, thereby reusing it (Japanese Patent Application Laid-Open No. 160833/1990) have been proposed.

According to the method (1), it is possible to precisely adjust a molar ratio of the alkali metal sulfide to the dihalo-aromatic compound in the polymerization step. However, a special exclusive apparatus for determining the amount of the hydrogen sulfide vaporized off in the dehydration step is required. In addition, a loss of analyzing time is caused. Further, problems of making hydrogen sulfide harmless and treating the harmless substance formed still remain in the treatment of the hydrogen sulfide vaporized off. The method (2) causes a great loss of energy because the amount of water to be removed increases in the case where the aqueous solution of the hydrogen sulfide recovered is recycled to the dehydration step of the subsequent batch. In the case where the aqueous solution of hydrogen sulfide recovered is recycled to the polymerization step of the subsequent batch, there are caused the above-described problems attendant upon the polymerization reaction in the system in which water co-exists in plenty. There is thus a demand for a further improvement in stabilization of variation in the melt viscosity of the formed PAS accompanying the variation in the amount of hydrogen sulfide vaporized off every batch.

OBJECTS AND SUMMARY OF THE INVENTION

It is an object of the present invention to provide an improved process for producing a poly(arylene sulfide), wherein hydrogen sulfide vaporized off in a dehydration step is recovered and reused in a polymerization reaction.

Another object of the present invention is to provide a process for efficiently producing a poly(arylene sulfide), which undergoes little variation in melt viscosity and has stable quality, by recovering hydrogen sulfide vaporized off in a dehydration step to reuse in a polymerization reaction.

A further object of the present invention is to provide a process for economically producing a poly(arylene sulfide).

The present inventors have carried out an extensive investigation with a view toward overcoming the above problems involved in the prior art and consequently hit upon a process in which hydrogen sulfide formed and vaporized off in a dehydration step of the production of PAS is absorbed in an organic amide solvent outside a system in which the dehydration step is carried out, thereby recovering it. According to this process, the hydrogen sulfide vaporized off in the dehydration step can be efficiently absorbed in the organic amide solvent to recover it. Since the organic amide solvent solution, in which hydrogen sulfide has been absorbed, can be reused in the polymerization reaction as it is, a burden imposed on the dehydration step is lightened compared with the conventional process wherein hydrogen sulfide is absorbed in an aqueous solution of an alkali metal hydroxide. When the hydrogen sulfide recovered is recycled to the polymerization reaction system and reused, a PAS having stable quality from the viewpoint of melt viscosity and the like can be efficiently obtained. The reuse of the hydrogen sulfide recovered can reduce loss of raw materials such as an alkali metal sulfide and an alkali metal hydrosulfide in the dehydration step to a great extent, and so it is possible to economically produce a PAS.

The present invention has been led to completion on the basis of these findings.

According to the present invention, there is thus provided a process for producing a poly(arylene sulfide), comprising a dehydration step of heating and dehydrating a mixture containing an organic amide solvent (a), an alkali metal sulfide and water to control a water content in the mixture and a subsequent polymerization step of subjecting the alkali metal sulfide and a dihalo-aromatic compound to a polymerization reaction in the organic amide solvent (a), wherein hydrogen sulfide vaporized off during the dehydration step is absorbed in another organic amide solvent (b) outside a system in which the dehydration step is carried out, thereby recovering it, and the hydrogen sulfide thus recovered is reused in the polymerization reaction as a raw material for the alkali metal sulfide.

DETAILED DESCRIPTION OF PREFERRED EMBODIMENTS

Alkali metal sulfide

Examples of the alkali metal sulfide useful in the practice of the present invention include lithium sulfide, sodium sulfide, potassium sulfide, rubidium sulfide, cesium sulfide and mixtures of two or more of these compounds. These alkali metal sulfides are generally sold and used in the form of a hydrate. Examples of the hydrates include sodium sulfide nonahydrate ($Na_2S.9H_2O$) and sodium sulfide pentahydrate ($Na_2S.5H_2O$). The alkali metal sulfide may be used in the form of an aqueous mixture. The alkali metal sulfide may also be prepared in situ in an organic amide solvent from an alkali metal hydrosulfide and an alkali metal hydroxide. It may also be possible to use a small amount of an alkali metal hydroxide in combination with the alkali metal sulfides to react it with alkali metal hydrosulfides and alkali metal thiosulfates, which may sometimes exist in a trace amount in the alkali metal sulfides, thereby removing these trace components or converting them into the alkali metal sulfides. Among these alkali metal sulfides, sodium sulfide and sodium hydrosulfide are the least expensive and hence and hence particularly preferred.

In the production process according to the present invention, water to be removed in the dehydration step includes water of hydration, water as a medium for the aqueous mixtures, water formed as a by-product by the reaction of the alkali metal hydrosulfide with the alkali metal hydroxide, and the like.

Dihalo-aromatic compound

The dihalo-aromatic compound useful in the practice of the present invention is a dihalogenated aromatic compound having 2 halogen atoms directly bonded to an aromatic ring. Specific examples of the dihalo-aromatic compound include o-dihalobenzenes, m-dihalobenzenes, p-dihalobenzenes, dihalotoluenes, dihalonaphthalenes, methoxy-dihalobenzenes, dihalobiphenyls, dihalobenzoic acids, dihalodiphenyl ethers, dihalodiphenyl sulfones, dihalodiphenyl sulfoxides and dihalodiphenyl ketones. Here, the halogen atoms mean individual atoms of fluorine, chlorine, bromine and iodine, and two halogen atoms in a dihalo-aromatic compound may be the same or different from each other. These dihalo-aromatic compounds may be used either singly or in any combination thereof. The amount of the dihalo-aromatic compound to be used is generally 0.9–1.5 mol, preferably 0.9–1.2 mol per mol of the alkali metal sulfide charged.

Molecular weight modifier, and branching or crosslinking agent

A monohalo compound (which may not be necessarily an aromatic compound) may be used in combination in order to form the terminals of the resulting PAS or to control the polymerization reaction or the molecular weight of the PAS. In addition, a polyhalo compound (which may not be necessarily an aromatic compound), to which three or more halogen atoms are bonded, an active hydrogen-containing halo-aromatic compound, a halo-aromatic nitro compound and/or the like may also be used in combination in order to form a branched or crosslinked polymer. Preferable examples of the polyhalo compound include trihalobenzenes.

Organic amide solvent

In the present invention, organic amide solvents, which are aprotic polar organic solvents, are used as solvents for the polymerization reaction and recovery of hydrogen sulfide. The organic amide solvent (a) used in the polymerization step is preferably stable to alkalis at a high temperature. Specific examples of the organic amide solvent (a) include amide compounds such as N,N-dimethylformamide and N,N-dimethylacetamide; N-alkylcaprolactam compounds such as N-methyl-$\epsilon$-caprolactam; N-alkylpyrrolidone compounds and N-cycloalkylpyrrolidone compounds such as N-methyl-2-pyrrolidone (hereinafter referred to as "NMP") and N-cyclohexyl-2-pyrrolidone; N,N-dialkylimidazolidinone compounds such as 1,3-dialkyl-2-imidazolidinones; tetraalkylurea compounds such as tetramethylurea; and hexaalkylphosphoric triamide compounds such as hexamethylphosphoric triamide. These organic amide solvents may be used either singly or in any combination thereof. Among these organic amide solvents, the N-alkylpyrrolidone compounds, N-cycloalkylpyrrolidone compounds, N-alkylcaprolactam compounds and N,N-dialkylimidazolidinone compounds are preferred, with NMP, N-methyl-$\epsilon$-caprolactam and 1,3-dialkyl-2-imidazolidinones being particularly preferred. The amount of the organic amide solvent (a) to be used in the polymerization reaction of the present invention is generally within a range of 0.1–10 kg per mol of the alkali metal sulfide.

As the organic amide solvent (b) which absorbs the hydrogen sulfide formed in the dehydration step, the same organic amide solvent as that used in the polymerization reaction may be used. Preferable examples of the organic amide solvent (b) for recovering hydrogen sulfide include N-alkylpyrrolidone compounds, N-cycloalkylpyrrolidone compounds, N-alkylcaprolactam compounds and N,N-dialkylimidazolidinone compounds. More specifically, NMP, N-methyl-$\epsilon$-caprolactam and 1,3-dialkyl-2-imidazolidinones are particularly preferred.

Polymerization aid

In the present invention, various polymerization aids may be used, as needed, with a view toward facilitating the polymerization reaction to obtain a PAS of high polymerization degree in a shorter period of time. Specific examples of the polymerization aids include metal salts of organic sulfonic acids, lithium halides, metal carboxylates and alkali metal phosphates which are generally known as polymerization aids for PAS. Among these, the metal carboxylates are particularly preferred because they are cheap. The amount of the polymerization aid to be used varies according to the kind of the compound used, but is generally within a range of 0.01–10 mol per mol of the alkali metal sulfide charged.

Polymerization reaction

In the present invention, a PAS is produced by reacting the alkali metal sulfide with the dihalo-aromatic compound in the organic amide solvent. In the polymerization reaction, a mixture containing the organic amide solvent, alkali metal sulfide and water is first heated and dehydrated prior to the polymerization step, thereby controlling the water content in the polymerization reaction system (dehydration step). After the dehydration step, a composition obtained in this dehydration step is mixed with the dihalo-aromatic compound, and the alkali metal sulfide and the dihalo-aromatic compound are heated in the organic amide solvent, thereby subjecting them to a polymerization reaction (polymerization step).

[Dehydration step]

The dehydration step is performed by heating the alkali metal sulfide in the organic amide solvent, desirably, in an inert gas atmosphere to separate water by distillation outside the reaction system. Since the alkali metal sulfide is generally used in the form of a hydrate or aqueous mixture, it contains water in an amount greater than that of the polymerization system needs. When an alkali metal hydrosulfide is used as a sulfur source, an alkali metal hydroxide is added in an amount almost equimolar thereto, thereby reacting both components in situ in the organic amide solvent to convert into its corresponding alkali metal sulfide. In this reaction, water is formed as a by-product. In the dehydration step, water composed of hydrate (water of crystallization), water as a medium for the aqueous mixture and water formed as the by-product is removed until the water content in the polymerization reaction system comes within a range of necessary amounts. In the dehydration step, the water is generally removed until the amount of water co-existing in the polymerization reaction system is reduced to about 0.3–5 mol per mol of the alkali metal sulfide. If the water content becomes too low by the dehydration step, water may be added prior to the polymerization step, thereby controlling the water content within the desired range.

These raw materials are charged within a temperature range of from ordinary temperature to 300° C., preferably from ordinary temperature to 200° C. The raw materials may be charged in no particular order. Further, the individual raw materials may be added in the course of the dehydration operation. As a solvent used in the dehydration step, any of the above-described organic amide solvents is used. This solvent is preferably the same as the organic amide solvent to be used in the polymerization step, with NMP being particularly preferred. The amount of the solvent to be used is generally within a range of 0.1–10 kg per mol of the alkali metal sulfide charged.

The dehydration operation is carried out by heating the composition charged, generally, at a temperature of 300° C. of lower, preferably, within a temperature range of from 60° C. to 280° C. for generally 15 minutes to 24 hours, preferably 30 minutes to 10 hours. Examples of a heating method include a method of holding a fixed temperature, a method of raising the temperature by stages or continuously, and a combination of both methods. The dehydration step is conducted by a batch system, a continuous system or a combination of both systems. An apparatus in which the dehydration step is conducted may be the same as a reaction vessel or reaction tank to be used in the subsequent polymerization step or different from that.

In the dehydration step, a part of the organic amide solvent is discharged together with water in the form of an azeotropic mixture. Water is discharged in the form of an azeotropic mixture with the organic amide solvent. Alternatively, the organic amide solvent and water are separated from each other by distillation, and only water is discharged. Further, the hydrogen sulfide is discharged together with water or the azeotropic mixture of water and the organic amide solvent.

[Recovery step of hydrogen sulfide]

Since the dehydration step is not a closed system, the alkali metal sulfide of a raw material reacts to water, whereby hydrogen sulfide is equilibratorily dissociated and vaporized off. In the present invention, the hydrogen sulfide formed and vaporized off in the dehydration step is absorbed in an organic amide solvent outside the system in which the dehydration step is carried out, thereby recovering it. The organic amide solvent absorbing hydrogen sulfide therein is able to use the same as that to be used in the polymerization step.

As described above, water or the azeotropic mixture of water and the organic amide solvent is discharged out of the system in the dehydration step. The hydrogen sulfide vaporized off is discharged together with the water or the azeotropic mixture out of the system. In order to recover the hydrogen sulfide vaporized off, therefore, the discharged matter from the dehydration step is first cooled to separate into a distillate mainly containing water or the azeotropic mixture of water and the organic amide solvent, and a hydrogen sulfide gas. The hydrogen sulfide gas separated is absorbed in the organic amide solvent outside the system in which the dehydration step is carried out, thereby recovering it.

The amount of the organic amide solvent to be used varies according to the temperature and pressure during the hydrogen sulfide absorption. However, it is desirably at least a sufficient amount to absorb the whole amount of the hydrogen sulfide vaporized off. When the hydrogen sulfide is absorbed at ordinary temperature and pressure, the amount of the solvent to be used is generally in a proportion of 0.1–30 kg per mol of the hydrogen sulfide vaporized off. The absorption temperature is generally 0°–200° C., preferably 10°–150° C. The absorption pressure is generally within a range of from ordinary pressure to 1 MPa, preferably from ordinary pressure to 0.5 MPa. When pressurizing, either a system that the whole apparatus from a dehydration and distillation column to an absorption tank of hydrogen sulfide is pressurized, or a system that only the absorption tank is pressurized may be used. It is preferable to continuously conduct the absorption of hydrogen sulfide during the operation of the dehydration step. The absorption tank may be a common packed column equipped with a circulating pump because the rate of absorption of hydrogen sulfide in the organic amide solvent is high. Even a gas absorber of the liquid-charging type or bubbling type may be satisfactorily used. The absorption may be conducted by either a continuous system or a batch system.

[Reuse of hydrogen sulfide recovered]

In the present invention, the hydrogen sulfide recovered is reused in the polymerization reaction as a raw material for the alkali metal sulfide. Specifically, the organic amide solvent solution (i.e., the absorbed solution) in which hydrogen sulfide has been absorbed is employed to reuse. More specifically, there are, for example, such embodiments that (1) the absorbed solution is recycled to the dehydration apparatus, in which the dehydration is being carried out, in the course of the operation of the dehydration step, (2) the absorbed solution is recycled to the dehydration apparatus, in which the dehydration has been carried out, at the time the dehydration step has been completed, (3) the absorbed solution is recycled to the polymerization apparatus at the time the polymerization reaction is started or in the course of the polymerization reaction in the subsequent polymerization step, (4) the absorbed solution is recycled to a dehydration step or polymerization step on and after the next batch, and (5) the absorbed solution is reused in a fresh polymerization reaction.

When an alkali metal hydroxide exists in the reaction system, hydrogen sulfide is converted into its corresponding alkali metal sulfide. When the hydrogen sulfide recovered is reused in the polymerization reaction as a raw material for the alkali metal sulfide, the amount of the co-existing alkali metal hydroxide is thus controlled within an adequate range. When the hydrogen sulfide recovered is recycled to the polymerization reaction system such as the dehydration step and/or the polymerization step, thereby reusing it, the molar ratio of the alkali metal sulfide to the dihalo-aromatic compound in the reaction can be exactly controlled, so that a PAS, which undergoes little variation in melt viscosity and has stable quality, can be obtained.

[Polymerization step]

The polymerization step is conducted by mixing the composition after completion of the dehydration step with the dihalo-aromatic compound and heating the mixture. The recycled solution in which hydrogen sulfide has been absorbed may be contained in the mixture. Upon the preparation of this mixture, the amounts of the organic amide solvent and co-existing water, and the like may be adjusted, and besides the polymerization aid and other additives may be mixed.

The mixing of the composition after completion of the dehydration step with the dihalo-aromatic compound is performed within a temperature range of generally 100°–350° C., preferably 120°–330° C. No particular limitation is imposed on the order of mixing, and the mixing is conducted by adding both components by bits or at a time. The hydrogen sulfide-absorbed solution may also be mixed in optional order.

The polymerization reaction is generally conducted at 100°–350° C., preferably 150°–330° C. As a heating method in this reaction, there may be used a method of holding a fixed temperature, a method of raising the temperature by stages or continuously or a combination of both methods. The polymerization reaction time is generally within a range of from 10 minutes to 72 hours, desirably from 30 minutes to 48 hours. The amount of the organic amide solvent used in this step is generally 0.1–10 kg, preferably 0.15–1 kg per mol of the sulfur-containing component existing in the polymerization step. The amount of the solvent may be changed in the course of the polymerization reaction so far as it is within this range.

The amount of the co-existing water at the time the polymerization reaction is started is preferably controlled within a range of generally 0.3–5 mol per mol of the alkali metal sulfide. However, when it is intended to obtain a low-molecular weight polymer or oligomer, or a special polymerization process is used, the amount of the co-existing water may be outside this range. For example, the amount of the co-existing water may be controlled within a range of 0.1–15 mol, preferably 0.5–10 mol per mol of the alkali metal sulfide. The amount of the co-existing water may be increased in the course of the polymerization reaction, or decreased by distillation to the contrary.

As a polymerization process in which the amount of the co-existing water is increased in the course of the polymerization reaction, there is, for example, a process wherein the reaction is conducted at a temperature of 180–235° C. in a state that water is present in a proportion of 0.5–2.4 mol per mol of the alkali metal sulfide, so as to give a conversion of the dihalo-aromatic compound of 50–98 mol %, and the reaction is then continued by adding water in such a manner that water is present in a proportion of 2.5–7 mol per mol of the alkali metal sulfide and raising the reaction temperature to 245°–290° C. (Japanese Patent Publication No. 33775/1988).

In order to reduce the contents of sodium chloride formed as a by-product and impurities in the resulting polymer, or to collect a polymer in the form of granules, water may be added in the final stage of the polymerization reaction or at the time of completion thereof to increase the water content. No particular limitation is imposed on the polymerization step of the present invention, and many of other known polymerization processes or variants thereof may be applied thereto. The system of the polymerization reaction may be a batch system, a continuous system or a combination of both systems. In the case of batch-wise polymerization, a system making use of two or more reaction vessels may be used in order to shorten the cycle time of the polymerization.

[Post-treatment]

The post-treatment in the polymerization process of the present invention can be carried out by a method known per se in the art. For example, after completion of the polymerization reaction, a slurry containing a formed product can be cooled and filtered as such without dilution or after dilution with water or the like, and the resulting polymer is washed with water and filtered repeatedly, and dehydrated or dried, whereby a PAS can be collected. The slurry containing the formed product may be subjected to sifting as it is in a state heated, thereby separating the polymer. After the filtration or sifting, the PAS may be washed with an organic solvent such as the same organic amide solvent as the solvent for the polymerization, a ketone or an alcohol, hot water, and/or the like. The PAS formed may be treated with an acid or a salt such as ammonium chloride.

[Polymer formed]

The PAS obtained by the process according to the present invention can be used as it is or after subjected to oxidative crosslinking, and molded or formed into various injection-molded products, and extruded products such as sheets, films, fibers and pipes by themselves or in the form of compositions mixed with one or more of various inorganic fillers and fibrous fillers, and various synthetic resins. When the hydrogen sulfide recovered is recycled to the polymerization reaction system according to the present invention, the resulting PAS can be stably subjected to these processings because the PAS undergoes little lot-to-lot variation in melt viscosity. Therefore, the molded or formed product obtained therefrom also undergoes little variation in various properties. Among PAS, polyphenylenesulfide is particularly preferred.

ADVANTAGES OF THE INVENTION

According to the present invention, hydrogen sulfide vaporized off in the dehydration step is absorbed in the organic amide solvent to recover it, and is reused in a polymerization reaction. Therefore, without increase of a burden imposed on the dehydration step, a loss of raw materials can be reduced, and environmental pollution due to the vaporization of hydrogen sulfide can be prevented. Besides, when the hydrogen sulfide recovered is recycled to the polymerization reaction system and reused, a PAS which undergoes little variation in melt viscosity and has stable quality can be obtained.

EMBODIMENTS OF THE INVENTION

The present invention will hereinafter be described more specifically by the following Examples and Comparative Examples. Measuring methods of physical properties are as follows:

(1) Loss of hydrogen sulfide

Loss (%) of hydrogen sulfide in the dehydration step was calculated in accordance with the following equation:

Loss of hydrogen sulfide=$[(A-B)/C]\times 100$ wherein

A: a sulfur-containing component vaporized (mol);

B: a sulfur-containing component reused (mol); and

C: a sulfur-containing component charged (mol).

(2) Yield of polymer

The yield was calculated on the basis of the weight (calculated amount) of a sulfur-containing component charged, the whole of which is assumed to have been converted into a polymer.

(3) Melt viscosity

The melt viscosity of a polymer was measured at 310° C. and a shear rate of 1200/sec.

[Comparative Example 1]

Polymerization example where hydrogen sulfide vaporized off during a dehydration step was not recycled Comparative Example 1a A 20-liter autoclave (reaction vessel) was charged with 6,000 g of NMP and 3,800 g of sodium sulfide pentahydrate containing 46.20 wt. % of sodium sulfide ($Na_2S$). After purged with nitrogen gas, the temperature of the contents was gradually raised to 200° C. over about 3.5 hours with stirring, thereby distilling off 1,566 g of water and 1,079 g NMP. At this time, 0.50 mol of hydrogen sulfide was vaporized off. Therefore, the available $Na_2S$ in the vessel after the dehydration step was reduced to 21.99 mol, and the amount of $H_2S$ vaporized off corresponded to 2.22 mol % of $Na_2S$ charged.

After the dehydration step described above, the reaction vessel containing 21.99 mol of the available $Na_2S$ was cooled down to 150° C., and 3,362 g (1.04 mol/mol of $Na_2S$) of p-dichlorobenzene (hereinafter abbreviated as "pDCB"), 3,327 g of NMP and 133 g of water (total water content in the vessel: 1.50 mol/mol of $Na_2S$) were added, and 4.1 g of NaOH having a purity of 97% were added in such a manner that the total amount of NaOH in the vessel was 5.00 mol % of the available $Na_2S$. Incidentally, NaOH (1.00 mol) formed by the vaporization of $H_2S$ was contained in the vessel.

While stirring at 250 rpm by a stirrer, the reactants were reacted at 220° C. for 4.5 hours (preliminary polymerization step). Thereafter, the number of revolutions of the stirrer was raised to 400 rpm, and 447 g of water were introduced under pressure into the vessel with stirring (total water content in the vessel: 2.63 mol/mol of $Na_2S$). After the introduction of water under pressure, the temperature of the contents was raised to 255° C. to conduct a reaction for 5.0 hours (final polymerization step).

After completion of the reaction, the reaction mixture was cooled near to room temperature, and the contents were sifted through a screen of 100 mesh to separate a granular polymer. The thus-separated granular polymer was washed twice with acetone and 3 times with water, thereby obtaining a washed polymer. This washed polymer was immersed in a 2% aqueous solution of ammonium chloride to treat the polymer at 40° C. for 40 minutes and then washed with water. The resultant granular polymer was dried at 105° C. for 3 hours. The yield of the granular polymer thus obtained was 85%, and its melt viscosity was 51 Pa.s.

Comparative Example 1b

Dehydration and polymerization were conducted in the same manner as in Comparative Example 1a except that after the dehydration step, 3,439 g of pDCB were added in such a manner that a molar ratio of $pDCB/Na_2S$ was 1.04 on the basis of the charged amount of sodium sulfide. In this case, $H_2S$ in an amount corresponding to 2.22 mol % of the charged amount of $Na_2S$ was vaporized off in the dehydration step, and so a substantial molar ratio of $pDCB/Na_2S$ in the reaction vessel was 1.06 (more accurately, 1.064) at the time the polymerization reaction was started. After completion of the polymerization, the formed product was treated in the same manner as described above to collect a granular polymer. The melt viscosity of the polymer thus collected was 21 Pa.s.

A comparison between Comparative Example 1b and Comparative Example 1a revealed that a polymer whose melt viscosity is almost near to the intended value can be obtained when the amount of hydrogen sulfide vaporized off is exactly determined after the dehydration step to control the molar ratio of $pDCB/Na_2S$ (Comparative Example 1a), while a polymer whose melt viscosity is decreased to a great extent is provided when the molar ratio of $pDCB/Na_2S$ is preset on the basis of the charged amount of sodium sulfide without determining the amount of hydrogen sulfide vaporized off (Comparative Example 1b).

[EXAMPLE 1]

Polymerization example where hydrogen sulfide vaporized off during a dehydration step was recycled EXAMPLE 1a A 20-liter autoclave was equipped with a Snyder's column of 3 cm in diameter, 90 cm in length and 10 stages. Further, a condenser was connected to the upper part of the Snyder's column so as to collect a distillate cooled by this condenser in a three-necked flask through a rubber tube (line). The three-necked flask was provided with a condenser and a gas line. The gas line from the three-necked flask was connected to a gas absorber (A) charged with 541 g of NMP, and a gas line from the gas absorber (A) was connected to a gas absorber (B) charged with 500 g of a 10% aqueous solution of NaOH so as to finally discharge the gas passed through the gas absorber (B) into the air. Incidentally, the reason why the three-necked flask equipped with the condenser was used in this experiment is that when the distillate is reflexed, the content of hydrogen sulfide in the distillate can be reduced, and the amount of hydrogen sulfide absorbed in the gas absorber (A) can be increased. However, the distillate was not refluxed in Example 1a.

Operation was conducted in the same manner as in Comparative Example 1a except that this reaction apparatus was used, 30 g of 97% NaOH were added to the 20-liter autoclave, and the charged amount of NMP was changed from 6,000 g to 5,000 g, thereby performing dehydration over 3.5 hours. It was confirmed that the temperature at the upper part of the condenser was about 100° C. during the dehydration, bubbles were formed in the individual gas absorbers, and the color of the solution in the gas absorber (A) charged with NMP changed from transparent water-whiteness to dark green and then yellow.

The distillate collected in the three-necked flask contained 1,454 g of water and 0.1 mol (25% of the whole $H_2S$ vaporized off) of $H_2S$ (containing substantially 0 g of NMP). The solution in the gas absorber (A) charged with NMP contained 0.28 mol (75% of the whole $H_2S$ vaporized off) of $H_2S$. No $H_2S$ was detected in the solution in the gas absorber (B) charged with the aqueous solution of NaOH.

After the dehydration step described above, the reaction vessel was cooled down to 150° C., and the whole amount of the NMP solution, in which $H_2S$ had been absorbed, in the gas absorber (A) was then recycled to the reaction vessel. As a result, the amount of the available sulfur existing in the reaction vessel was recovered to 22.39 mol. Therefore, loss of $H_2S$ was 0.44 mol % of the charged amount of $Na_2S$. Since the $H_2S$ recycled to the reaction vessel reacts to NaOH in the reaction vessel into $Na_2S$, the amount of the available $Na_2S$ amounts to 22.39 mol. Added to the reaction vessel were 3,424 g (1.04 mol/mol of $Na_2S$) of pDCB, 2,857 g of NMP, 18 g of water (total water content in the vessel: 1.50 mol/mole of $Na_2S$) and 7.9 g of 97% NaOH, so as to give the same composition as in Comparative Example 1a. The total amount of NaOH (including NaOH formed by the vaporization of $H_2S$) in the vessel amounts to 5.00 mol % of the available $Na_2S$. Incidentally, the total water content in the vessel includes the amount of water formed by the reaction of $H_2S$ with NaOH.

While stirring at 250 rpm by a stirrer, the reactants were reacted at 220° C. for 4.5 hours (preliminary polymerization step). Thereafter, the number of revolutions of the stirrer was raised to 400 rpm, and 456 g of water were introduced under pressure into the vessel with stirring (total water content in the vessel: 2.63 mol/mol of $Na_2S$), and the temperature of the contents was raised to 255° C. to conduct a reaction for 5.0 hours (final polymerization step). Thereafter, the resultant reaction mixture was treated in the same manner as in Comparative Example 1a, thereby collecting a granular polymer. The yield of the granular polymer thus obtained was 91%, and its melt viscosity was 41 Pa.s.

EXAMPLE 1b

Dehydration and polymerization were conducted in the same manner as in Example 1a except that after the dehydration step, 3,439 g of pDCB were added in such a manner that a molar ratio of pDCB/Na$_2$S was 1.04 on the basis of the charged amount of sodium sulfide. In this case, H$_2$S vaporized off in the dehydration step was recovered and recycled, so that H$_2$S was lost only in an amount corresponding to 0.44 mol % of the charged amount of Na$_2$S. Accordingly, a substantial molar ratio of pDCB/Na$_2$S in the reaction vessel was 1.04 (more accurately, 1.045) at the time the polymerization reaction was started. After completion of the polymerization, the formed product was treated in the same manner as described above to collect a granular polymer. The melt viscosity of the polymer thus collected was 38 Pa.s.

Therefore, when the hydrogen sulfide vaporized off in the dehydration step is recovered to recycle to the polymerization reaction system according to the process of the present invention, a polymer whose melt viscosity is almost near to the intended value can be obtained without precisely determining the amount of hydrogen sulfide vaporized off at the time of the dehydration step.

[EXAMPLE 2]
Polymerization example where hydrogen sulfide vaporized off during a dehydration step was recycled The same apparatus as in Example 1 except that a circulating packed column packed with Raschig rings was used as a gas absorption column (C) for absorbing H$_2$S in place of the gas absorber (A) was used. The gas absorption column (C) had a diameter of 2 cm and a length of 40 cm, and the gross area of the packing was 0.117 m$^2$. Gas absorbing NMP was used in an amount of 1,346 g and circulated at a rate of 5.8 liter/hr by a common pump.

Operation was conducted in the same manner as in Comparative Example 1a except that this reaction apparatus was used, 30 g of 97% NaOH were added to the 20-liter autoclave, and the charged amount of NMP was changed from 6,000 g to 4,600 g, thereby performing dehydration over 3.5 hours. The distillate collected in the three-necked flask contained 1,459 g of water and 0.07 mol (17% of the whole H$_2$S vaporized off) of H$_2$S (containing substantially 0 g of NMP). The gas absorbing solution in the gas absorption column (C) contained 0.34 mol (83% of the whole H$_2$S vaporized off) of H$_2$S. No H$_2$S was detected in the solution in the gas absorber (B) charged with the aqueous solution of NaOH.

After the dehydration step described above, the reaction vessel was cooled down to 150° C., and the whole amount of the NMP solution, in which H$_2$S had been absorbed, in the gas absorption column (C) was then recycled to the reaction vessel. As a result, the amount of the available sulfur existing in the reaction vessel was recovered to 22.42 mol. Therefore, loss of H$_2$S was 0.31 mol % of the charged amount of Na$_2$S. Since the H$_2$S recycled to the reaction vessel reacts to NaOH in the reaction vessel into Na$_2$S, the amount of the available Na$_2$S amounts to 22.42 mol. Added to the reaction vessel were 3,424 g (1.04 mol/mol of Na$_2$S) of PDCB, 2,462 g of NMP, 23 g of water (total water content in the vessel: 1.50 mol/mole of Na$_2$S) and 10.2 g of 97% NaOH, so as to give the same composition as in Comparative Example 1a. The total amount of NaOH in the vessel amounts to 5.00 mol % of the available Na$_2$S.

While stirring at 250 rpm by a stirrer, the reactants were reacted at 220° C. for 4.5 hours (preliminary polymerization step). Thereafter, the number of revolutions of the stirrer was raised to 400 rpm, and 456 g of water were introduced under pressure into the vessel with stirring (total water content in the vessel: 2.63 mol/mol of Na$_2$S), and the temperature of the contents was raised to 255° C. to conduct a reaction for 5.0 hours (final polymerization step). Thereafter, the resultant reaction mixture was treated in the same manner as in Comparative Example 1a, thereby collecting a granular polymer. The yield of the granular polymer thus obtained was 88%, and its melt viscosity was 47 Pa.s.

Accordingly, it was revealed that even when the method for absorbing hydrogen sulfide is changed, the yield and melt viscosity of the resulting polymer remain substantially unchanged.

[Comparative Example 2]
Polymerization example where hydrogen sulfide vaporized off during a dehydration step was not recycled Comparative Example 2a A dehydration step was performed in the same manner as in Comparative Example 1a except that the reaction vessel was charged with 3,600 g of sodium sulfide pentahydrate containing 46.14 wt. % of Na$_2$S and 6,000 g of NMP, and the dehydration time was changed to 4.0 hours. As a result, 1,440 g of water, 1,074 g NMP and 0.45 mol of hydrogen sulfide were distilled off. The available Na$_2$S in the vessel was reduced to 20.83 mol. Therefore, loss of H$_2$S was 2.11 mol % of the charged amount of Na$_2$S.

After the dehydration step described above, the reaction vessel containing 20.83 mol of the available Na$_2$S was cooled down to 150° C., and 3,124 g (1.02 mol/mol of Na$_2$S) of pDCB, 3,407 g of NMP and 78 g of water (total water content in the vessel: 1.50 mol/mol of Na$_2$S) were added, and 5.8 g of NaOH having a purity of 97% were added in such a manner that the total amount of NaOH in the vessel was 5.00 mol % of the available Na$_2$S. Incidentally, NaOH (0.90 mol) formed by the vaporization of H$_2$S was contained in the vessel.

While stirring at 250 rpm by a stirrer, the reactants were reacted at 220° C. for 4.5 hours (preliminary polymerization step). Thereafter, the number of revolutions of the stirrer was raised to 400 rpm, and 488 g of water were introduced under pressure into the vessel with stirring (total water content in the vessel: 2.79 mol/mol of Na$_2$S). The temperature of the contents was raised to 255° C. to conduct a reaction for 5.0 hours (final polymerization step). After completion of the reaction, the formed product was treated in the same manner as in Comparative Example 1a to collect a granular polymer. The yield of the granular polymer was 87%, and its melt viscosity was 107 Pa.s.

Comparative Example 2b

This Comparative Example 2b describes an example where when the dehydration conditions are changed, the yield and physical properties of the resulting polymer vary compared with Comparative Example 2a.

A dehydration step was performed in the same manner as in Comparative Example 2a except that the dehydration time was changed from 4.0 hours to 2.5 hours. As a result, 1,475 g of water, 1,156 g NMP and 0.37 mol of hydrogen sulfide were distilled off. The available Na$_2$S in the vessel was reduced to 20.91 mol. Therefore, loss of H$_2$S was 1.74 mol % of the charged amount of Na$_2$S.

After the dehydration step described above, the reaction vessel was cooled down to 150° C., and 3,124 g of pDCB, 3,407 g of NMP, 78 g of water and 5.8 g of 97% NaOH, which were exactly the same weights as the respective components in Comparative Example 2a, were then added in disregard of the amount of the available Na$_2$S in the vessel. The subsequent polymerization reaction was also conducted in the same manner as in Comparative Example 2a. After completion of the reaction, the formed product was treated in the same manner as in Comparative Example 2a to collect a granular polymer. The yield of the granular polymer was 85%, and its melt viscosity was 121 Pa.s.

The comparative results between Comparative Example 2a and Comparative Example 2b show that when the hydrogen sulfide vaporized off during the dehydration step is not recycled, the melt viscosity of the resulting polymer greatly varies with a slight difference in reaction conditions.

[EXAMPLE 3]
Polymerization example where hydrogen sulfide vaporized off during a dehydration step was recycled EXAMPLE 3a A dehydration step was performed in the same manner as in Example 1a except that 3,600 g of sodium sulfide pentahydrate containing 46.14 wt. % of $Na_2S$ and 4,100 g of NMP were used, 30 g of 97% NaOH were added, and the dehydration time was changed to 4.0 hours. The distillate collected in the three-necked flask contained 1,397 g of water and 0.1 mol (26% of the whole $H_2S$ vaporized off) of $H_2S$ (containing substantially 0 g of NMP). The solution in the gas absorber (A) charged with 503 g of NMP contained 0.29 mol (74% of the whole $H_2S$ vaporized off) of $H_2S$. No $H_2S$ was detected in the solution in the gas absorber (B) charged with the aqueous solution of NaOH.

After the dehydration step described above, the reaction vessel was cooled down to 150° C., and the whole amount of the NMP solution, in which $H_2S$ had been absorbed, in the gas absorber (A) was then recycled to the reaction vessel. As a result, the amount of the available sulfur existing in the reaction vessel was recovered to 21.18 mol. Therefore, loss of $H_2S$ was 0.47 mol % of the charged amount of $Na_2S$. Since the $H_2S$ recycled to the reaction vessel reacts to NaOH in the reaction vessel into $Na_2S$, the amount of the available $Na_2S$ amounts to 21.18 mol. Added to the reaction vessel were 3,177 g (1.02 mol/mol of $Na_2S$) of PDCB, 3,870 g of NMP, 34 g of water (total water content in the vessel: 1.50 mol/mole of $Na_2S$) and 5.4 g of 97% NaOH, so as to give the same composition as in Comparative Example 2a. The total amount of NaOH in the vessel amounts to 5.10 mol % of the available $Na_2S$.

While stirring at 250 rpm by a stirrer, the reactants were reacted at 220° C. for 4.5 hours (preliminary polymerization step). Thereafter, the number of revolutions of the stirrer was raised to 400 rpm, and 496 g of water were introduced under pressure into the vessel with stirring (total water content in the vessel: 2.80 mol/mol of $Na_2S$), and the temperature of the contents was raised to 255° C. to conduct a reaction for 5.0 hours (final polymerization step). Thereafter, the resultant reaction mixture was treated in the same manner as in Comparative Example 2a, thereby collecting a granular polymer. The yield of the granular polymer thus obtained was 91%, and its melt viscosity was 114 Pa.s.

EXAMPLE 3b

This Example 3b describes an example where even when the dehydration conditions are changed, the yield and physical properties of the resulting polymer scarcely vary compared with Example 3a.

A dehydration step was performed in the same manner as in Example 3a except that the dehydration time was changed to 2.5 hours. As a result, the distillate collected in the three-necked flask contained 1,405 g of water and 0.095 mol (25% of the whole $H_2S$ vaporized off) of $H_2S$ (containing substantially 0 g of NMP). The solution in the gas absorber (A) charged with NMP contained 0.29 mol (75% of the whole $H_2S$ vaporized off) of $H_2S$. No $H_2S$ was detected in the solution in the gas absorber (B) charged with the aqueous solution of NaOH.

After the dehydration step described above, the reaction vessel was cooled down to 150° C., and the whole amount of the NMP solution, in which $H_2S$ had been absorbed, in the gas absorber (A) was then recycled to the reaction vessel. As a result, the amount of the available sulfur existing in the reaction vessel was recovered to 21.19 mol. Therefore, loss of H2S was 0.45 mol % of the charged amount of $Na_2S$. Since the $H_2S$ recycled to the reaction vessel reacts to NaOH in the reaction vessel into $Na_2S$, the amount of the available $Na_2S$ amounts to 21.19 mol. In disregard of the amount of the available $Na_2S$ in the vessel, 3,177 g of pDCB, 3,870 g of NMP, 34 g of water and 5.4 g of 97% NaOH, which were exactly the same weights as the respective components in Example 3a, were then added. The subsequent polymerization reaction was also conducted in the same manner as in Example 3a. After completion of the reaction, the formed product was treated in the same manner as in Example 3a to collect a granular polymer. The yield of the granular polymer was 90%, and its melt viscosity was 117 Pa.s.

The comparative results between Example 3a and Example 3b show that when the hydrogen sulfide vaporized off during the dehydration step is recycled, the yield and melt viscosity of the resulting polymer scarcely vary with a difference in the dehydration conditions.

[Comparative Example 3]
Polymerization example where hydrogen sulfide vaporized off during a dehydration step was not recycled Comparative Example 3a A dehydration step was performed in the same manner as in Comparative Example 1a except that 3,600 g of sodium sulfide pentahydrate containing 46.15 wt. % of $Na_2S$ and 6,700 g of NMP were used, and 20 g of 97% NaOH were added. As a result, 1,442 g of water, 1,074 g NMP and 0.48 mol of hydrogen sulfide were distilled off. The available $Na_2S$ in the vessel was reduced to 20.81 mol, and loss of $H_2S$ was 2.25 mol % of the charged amount of $Na_2S$.

After the dehydration step described above, the reaction vessel containing 20.81 mol of the available $Na_2S$ was cooled down to 150° C., and 3,089 g (1.01 mol/mol of $Na_2S$) of pDCB, 2,697 g of NMP, 83 g of water (total water content in the vessel: 1.50 mol/mol of $Na_2S$) and 4.8 g of 97% NaOH were then added. The total amount of NaOH in the vessel was 7.50 mol % of the available $Na_2S$.

While stirring at 250 rpm by a stirrer, the temperature of the contents was continuously raised from 220°° C. to 260° C. over 1.5 hours to react the reactants (preliminary polymerization step). Thereafter, the number of revolutions of the stirrer was raised to 400 rpm, 487 g of water were introduced under pressure into the vessel with stirring (total water content in the vessel: 2.80 mol/mol of $Na_2S$), and the temperature of the contents was raised to 260° C. to conduct a reaction for 5.0 hours (final polymerization step). After completion of the reaction, the formed product was treated in the same manner as in Comparative Example 1a to collect a granular polymer. The yield of the granular polymer was 83%, and its melt viscosity was 216 Pa.s.

Comparative Example 3b

Dehydration and polymerization were conducted in the same manner as in Comparative Example 3a except that after the dehydration step, 3,160 g of pDCB were added in such a manner that a molar ratio of pDCB/Na$_2$S was 1.01 on the basis of the charged amount of sodium sulfide. In this case, H$_2$S in an amount corresponding to 2.25 mol % of the charged amount of Na$_2$S was vaporized off in the dehydration step, and so a substantial molar ratio of pDCB/Na$_2$S in the reaction vessel was 1.03 (more accurately, 1.033) at the time the polymerization reaction was started. After completion of the polymerization, the formed product was treated in the same manner as described above to collect a granular polymer. The melt viscosity of the polymer thus collected was 108 Pa.s.

A comparison between Comparative Example 3a and Comparative Example 3b revealed that a polymer whose melt viscosity is almost near to the intended value can be obtained when the amount of hydrogen sulfide vaporized off is exactly determined after the dehydration step to control the molar ratio of pDCB/Na$_2$S (Comparative Example 3a), while a polymer whose melt viscosity is decreased to a great extent is provided when the molar ratio of pDCB/Na$_2$S is preset on the basis of the charged amount of sodium sulfide without determining the amount of hydrogen sulfide vaporized off (Comparative Example 3b).

[EXAMPLE 4]
Polymerization example where hydrogen sulfide vaporized off during a dehydration step was recycled EXAMPLE 4a A dehydration step was performed in the same manner as in Example 1a except that 3,600 g of sodium sulfide pentahydrate containing 46.15 wt. % of Na$_2$S and 4,400 g of NMP were used, and 50 g of 97% NaOH were added. The distillate collected in the three-necked flask contained 1,375 g of water and 0.11 mol (24% of the whole H$_2$S vaporized off) of H$_2$S (containing substantially 0 g of NMP). The solution in the gas absorber (A) charged with 807 g of NMP contained 0.34 mol (76% of the whole H$_2$S vaporized off) of H$_2$S. No H$_2$S was detected in the solution in the gas absorber (B) charged with the aqueous solution of NaOH.

After the dehydration step described above, the reaction vessel was cooled down to 150° C., and the whole amount of the NMP solution, in which H$_2$S had been absorbed, in the gas absorber (A) was then recycled to the reaction vessel. As a result, the amount of the available sulfur existing in the reaction vessel was recovered to 21.18 mol. Therefore, loss of H$_2$S was 0.52 mol % of the charged amount of Na$_2$S. Since the H$_2$S recycled to the reaction vessel reacts to NaOH in the reaction vessel into Na$_2$S, the amount of the available Na$_2$S amounts to 21.18 mol. Added to the reaction vessel were 3,144 g (1.01 mol/mol of Na$_2$S) of PDCB, 3,264 g of NMP, 12 g of water (total water content in the vessel: 1.50 mol/mole of Na$_2$S) and 6.4 g of 97% NaOH, so as to give the same polymerization reaction composition as in Comparative Example 3a. The total amount of NaOH in the vessel amounts to 7.50 mol % of the available Na$_2$S.

While stirring at 250 rpm by a stirrer, the temperature of the contents was continuously raised from 220° C. to 260° C. over 1.5 hours to react the reactants (preliminary polymerization step). Thereafter, the number of revolutions of the stirrer was raised to 400 rpm, 496 g of water were introduced under pressure into the vessel with stirring (total water content in the vessel: 2.80 mol/mol of Na$_2$S), and the temperature of the contents was raised to 260°C. to conduct a reaction for 5.0 hours (final polymerization step). After completion of the reaction, the formed product was treated in the same manner as in Comparative Example 3a to collect a granular polymer. The yield of the granular polymer was 86%, and its melt viscosity was 195 Pa.s.

EXAMPLE 4b

Dehydration and polymerization were conducted in the same manner as in Example 4a except that after the dehydration step, 3,160 g of pDCB were added in such a manner that a molar ratio of pDCB/Na$_2$S was 1.01 on the basis of the charged amount of sodium sulfide. In this case, H$_2$S vaporized off in the dehydration step was recovered and recycled, so that H$_2$S was lost only in an amount corresponding to 0.52 mol % of the charged amount of Na$_2$S. Accordingly, a substantial molar ratio of pDCB/Na$_2$S in the reaction vessel was 1.02 (more accurately, 1.015) at the time the polymerization reaction was started. After completion of the polymerization, the formed product was treated in the same manner as described above to collect a granular polymer. The melt viscosity of the polymer thus collected was 183 Pa.s.

Therefore, when the hydrogen sulfide vaporized off in the dehydration step is recovered and recycled to the polymerization reaction system according to the process of the present invention, a polymer whose melt viscosity is almost near to the intended value can be provided without precisely determining the amount of hydrogen sulfide vaporized off at the time of the dehydration step.

[EXAMPLE 5]
Polymerization example where only H$_2$S absorbed in NMP was used as a sulfur source A dehydration step was performed in the same manner as in Example 1a except that 3,800 g of sodium sulfide pentahydrate containing 46.14 wt. % of Na$_2$S and 4,000 g of NMP were used. As a result, the solution in the gas absorber (A) charged with 418 g of NMP contained 0.50 mol of H$_2$S. Loss of H$_2$S was 2.23 mol % of the charged amount of Na$_2$S.

This gas-absorbed solution was charged into a 1-liter autoclave, and 42.8 g (1.04 mol) of NaOH and 76.44 g (0.52 mol) of PDCB were then added. Since water formed by the reaction of H$_2$S with NaOH was contained in the vessel, the total water content in the vessel was 2.00 mol/mol of Na$_2$S.

While stirring at 250 rpm by a stirrer, the reactants were reacted at 220° C. for 4.5 hours (preliminary polymerization step). Thereafter, the number of revolutions of the stirrer was raised to 400 rpm, and 31 g of water were introduced under pressure into the vessel with stirring (total water content in the vessel: 5.44 mol/mol of Na$_2$S), and the temperature of the contents was raised to 255° C. to conduct a reaction for 5.0 hours (final polymerization step). Thereafter, the resultant reaction mixture was treated in the same manner as in Comparative Example 1a, thereby collecting a granular polymer. The yield of the granular polymer thus obtained was 86%, and its melt viscosity was 136 Pa.s.

These reaction conditions and results are shown collectively in Table 1.

TABLE 1

|  | Loss of H$_2$S (%) | Preliminary polymerization | | | | | | Final polymerization | | | Polymer | |
|---|---|---|---|---|---|---|---|---|---|---|---|---|
|  |  | Na$_2$S/ NMP (mol/ Kg) | pDCB/ Na$_2$S (mol/ mol) | H$_2$O/ Na$_2$S (mol/ mol) | NaOH/ Na$_2$S (mol %) | Temperature (°C.) | Time (hr) | H$_2$O/ Na$_2$S (mol/ mol) | Temperature (°C.) | Time (hr) | Yield (%) | Melt viscosity (Pa.s) |
| Comp. Ex. 1a | 2.22 | 2.67 | 1.04 | 1.50 | 5.00 | 220 | 4.5 | 2.63 | 255 | 5.0 | 85 | 51 |
| Comp. Ex. 1b | 2.22 | 2.67 | 1.06 | 1.50 | 5.00 | 220 | 4.5 | 2.63 | 255 | 5.0 | 82 | 21 |
| Ex. 1a | 0.44 | 2.67 | 1.04 | 1.50 | 5.00 | 220 | 4.5 | 2.63 | 255 | 5.0 | 91 | 41 |
| Ex. 1b | 0.44 | 2.67 | 1.04 | 1.50 | 5.00 | 220 | 4.5 | 2.63 | 255 | 5.0 | 92 | 38 |
| Ex. 2 | 0.31 | 2.67 | 1.04 | 1.50 | 5.00 | 220 | 4.5 | 2.63 | 255 | 5.0 | 88 | 47 |
| Comp. Ex. 2a | 2.11 | 2.59 | 1.02 | 1.50 | 5.00 | 220 | 4.5 | 2.79 | 255 | 5.0 | 87 | 107 |
| Comp. Ex. 2b | 1.74 | 2.62 | 1.02 | 1.54 | 4.21 | 220 | 4.5 | 2.73 | 255 | 5.0 | 85 | 121 |
| Ex. 3a | 0.47 | 2.50 | 1.02 | 1.50 | 5.00 | 220 | 4.5 | 2.80 | 255 | 5.0 | 91 | 114 |
| Ex. 3b | 0.45 | 2.50 | 1.02 | 1.48 | 5.00 | 220 | 4.5 | 2.78 | 255 | 5.0 | 90 | 117 |
| Comp. Ex. 3a | 2.25 | 2.50 | 1.01 | 1.50 | 7.50 | 220–260 | 1.5 | 2.84 | 260 | 5.0 | 83 | 216 |
| Comp. Ex. 3b | 2.25 | 2.50 | 1.03 | 1.50 | 7.50 | 220–260 | 1.5 | 2.80 | 260 | 5.0 | 85 | 108 |
| Ex. 4a | 0.52 | 2.50 | 1.01 | 1.50 | 7.50 | 220–260 | 1.5 | 2.80 | 260 | 5.0 | 86 | 195 |
| Ex. 4b | 0.52 | 2.50 | 1.02 | 1.50 | 7.50 | 220–260 | 1.5 | 2.80 | 260 | 5.0 | 87 | 183 |
| Ex. 5 | 2.23 | 1.20 | 1.04 | 2.00 | 7.60 | 220 | 4.5 | 5.44 | 255 | 5.0 | 86 | 136 |

We claim:

1. A process for producing a poly(arylene sulfide), comprising a dehydration step of heating and dehydrating a mixture containing an organic amide solvent (a), an alkali metal sulfide and water to control a water content in the mixture and a subsequent polymerization step of subjecting the alkali metal sulfide and a dihalo-aromatic compound to a polymerization reaction in the organic amide solvent (a), wherein hydrogen sulfide vaporized off during the dehydration step is absorbed in another organic amide solvent (b) outside a system in which the dehydration step is carried out, thereby recovering it, and the hydrogen sulfide thus recovered is reused in the polymerization reaction as a raw material for the alkali metal sulfide.

2. The process according to claim 1, wherein the amount of the organic amide solvent (a) to be used is in a proportion ranging from 0.1 to 10 kg per mol of the alkali metal sulfide charged.

3. The process according to claim 1, wherein dehydration is conducted in the dehydration step until the water content is reduced to a range of 0.3–5 mol per mol of the alkali metal sulfide.

4. The process according to claim 1, wherein the mixture containing an organic amide solvent (a), an alkali metal sulfide and water is heated in a temperature range of 60°–280° C. for 15 minutes to 24 hours in the dehydration step to dehydrate the mixture.

5. The process according to claim 1, wherein the organic amide solvent (a) is at least one selected from the group consisting of N-alkylpyrrolidone compounds, N-cycloalkylpyrrolidone compounds, N-alkylcaprolactam compounds and N,N-dialkylimidazolidinone compounds.

6. The process according to claim 1, wherein the organic amide solvent (b) absorbing hydrogen sulfide therein is the same as the organic amide solvent (a) used in the dehydration step and the polymerization step.

7. The process according to claim 1, wherein in the step of recovering the hydrogen sulfide vaporized off in the dehydration step, (i) the discharged matter from the dehydration step out of the system is cooled to separate into a distillate mainly containing water or an azeotropic mixture of water and the organic amide solvent (a), and a hydrogen sulfide gas, and (ii) the hydrogen sulfide gas separated is absorbed in the organic amide solvent (b) outside the system in which the dehydration step is carried out, thereby recovering it.

8. The process according to claim 1, wherein the amount of the organic amide solvent (b) to be used is a sufficient amount to absorb the whole amount of the hydrogen sulfide vaporized off in the dehydration step.

9. The process according to claim 8, wherein the amount of the organic amide solvent (b) to be used is in a proportion ranging from 0.1 to 30 kg per mol of the hydrogen sulfide vaporized off in the dehydration step.

10. The process according to claim 1, wherein the hydrogen sulfide vaporized off in the dehydration step is absorbed in the organic amide solvent (b) at an absorption temperature of 0°–200° C. and an absorption pressure ranging from ordinary pressure to 1 MPa outside the system in which the dehydration step is carried out.

11. The process according to claim 1, wherein the absorption of the hydrogen sulfide vaporized off in the dehydration step in the organic amide solvent (b) is performed in an absorption tank containing the organic amide solvent (b).

12. The process according to claim 11, wherein the absorption tank is a packed column equipped with a circulating pump, a liquid-charging type gas absorber or a bubbling type gas absorber.

13. The process according to claim 1, wherein in the step of reusing the hydrogen sulfide recovered in the polymerization reaction as a raw material for the alkali metal sulfide, the organic amide solvent (b), in which the hydrogen sulfide has been absorbed, is recycled to the dehydration apparatus, in which the dehydration is being carried out, in the course of the operation of the dehydration step.

14. The process according to claim 1, wherein in the step of reusing the hydrogen sulfide recovered in the polymerization reaction as a raw material for the alkali metal sulfide, the organic amide solvent (b), in which the hydrogen sulfide has been absorbed, is recycled to the dehydration apparatus, in which the dehydration has been carried out, at the time the dehydration step has been completed.

15. The process according to claim 1, wherein in the step of reusing the hydrogen sulfide recovered in the polymerization reaction as a raw material for the alkali metal sulfide, the organic amide solvent (b), in which the hydrogen sulfide has been absorbed, is recycled to a polymerization apparatus at the time the polymerization reaction is started or in the course of the polymerization reaction in the subsequent polymerization step.

16. The process according to claim 1, wherein in the step of reusing the hydrogen sulfide recovered in the polymerization reaction as a raw material for the alkali metal sulfide, the organic amide solvent (b), in which the hydrogen sulfide has been absorbed, is recycled to a dehydration step or polymerization step on and after the next batch.

17. The process according to claim 1, wherein in the step of reusing the hydrogen sulfide recovered in the polymerization reaction as a raw material for the alkali metal sulfide, the organic amide solvent (b), in which the hydrogen sulfide has been absorbed, is reused in a fresh polymerization reaction.

18. The process according to claim 1, wherein the poly (arylene sulfide) is poly(phenylene sulfide).

19. The process according to claim 1, wherein the amount of the dihalo-aromatic compound to be used is in a proportion ranging from 0.9 to 1.5 mol per mol of the alkali metal sulfide charged.

* * * * *